May 3, 1927.
S. G. DOWN
1,626,670
MOTOR VEHICLE BRAKE DEVICE
Filed Feb. 9, 1923
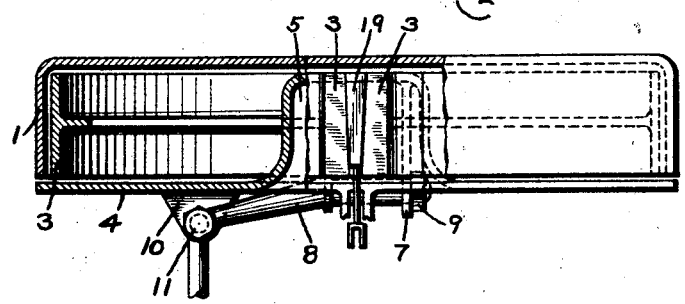
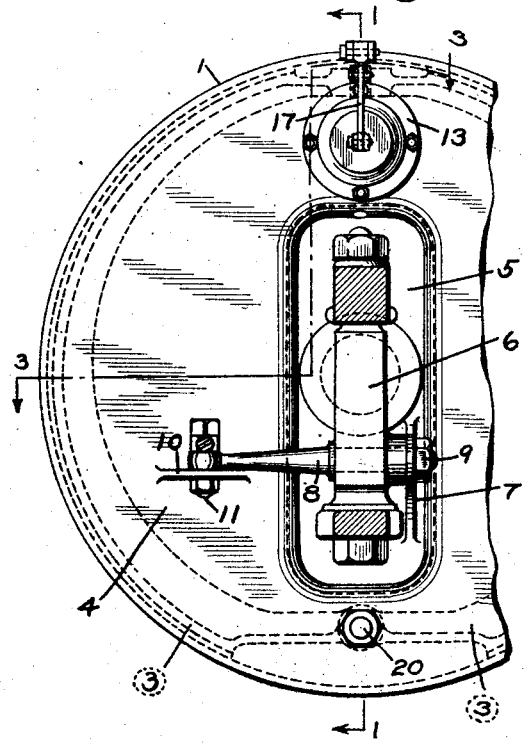
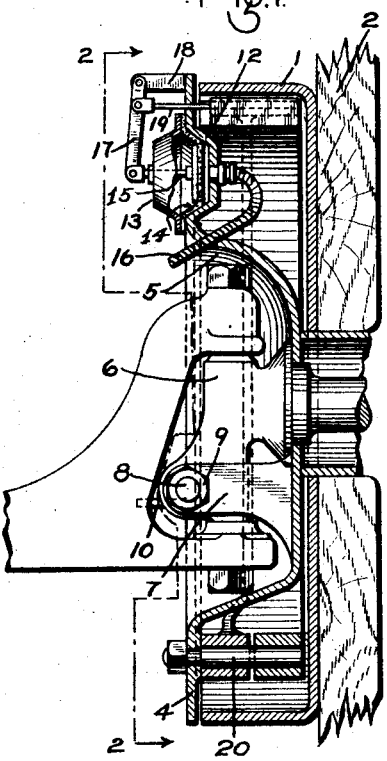
INVENTOR
SIDNEY G. DOWN
BY *Wm. M. Cady*
ATTORNEY Patented May 3, 1927.

1,626,670

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

MOTOR-VEHICLE BRAKE DEVICE.

Application filed February 9, 1923. Serial No. 618,162.

This invention relates to fluid pressure brakes, and more particularly to a fluid pressure brake adapted for application to the front wheel of a motor vehicle.

The principal object of my invention is to provide an improved front wheel fluid pressure controlled brake.

In the accompanying drawing; Fig. 1 is a vertical section on the line 1—1 of Fig. 2 of a fluid pressure brake applied to a front wheel and embodying my invention; Fig. 2 a section on the line 2—2 of Fig. 1; and Fig. 3 a section on the line 3—3 of Fig. 2.

As shown in the drawing, a brake drum 1 is applied to the front wheel 2 of a motor vehicle and within said drum are mounted internal expanding brake shoes 3. A brake drum cover plate 4 is provided, having a central rectangular depressed portion 5 to provide a space for the usual steering knuckle 6. A lug 7 is provided on the cover plate 4, the other end of which is apertured to receive the threaded end of the steering arm 8, so that said lug may be clamped in position when the steering arm nut 9 is screwed tight, for holding the cover plate 4 in position. An apertured lug 10 is also provided on the cover plate 4, which is so positioned that the pivot pin 11 of the steering arm 8 will register with the aperture in the lug, to provide an additional support for the cover plate, when the parts are assembled.

At its upper portion, the cover plate 4 is depressed at 12 to form a half section of a diaphragm chamber, the other half section of the chamber being in the form of a cover plate 13 adapted to be secured to the drum cover plate 4, so as to register with the depressed portion 12. Within the diaphragm chamber is a flexible diaphragm 14 adapted to operate a diaphragm rod 15 and fluid under pressure for operating said diaphragm is supplied thereto through a flexible hose 16. A lever 17 is pivotally connected at one end to a lug 18 carried by the cover plate 4 and the other end of the lever is pivotally connected to the diaphragm rod 15.

At an intermediate point, a wedge member 19 is pivotally connected to the lever 17 and said wedge member is interposed between the upper adjacent ends of the brakes shoes 3.

The lower adjacent ends of the brake shoes 3 are pivotally mounted on a pin 20 which is secured to the cover plate 4.

In operation, if it is desired to apply the brakes, fluid under pressure is supplied through the flexible hose 16 to the diaphragm chamber and the diaphragm 14 is then operated so as to move the diaphragm rod 15 outwardly. The wedge member 19 is consequently moved so as to exert a wedging action on the adjacent engaging ends of the brake shoes 3 and thus cause the frictional engagement of the brake shoes with the brake drum 1 to apply the brakes.

The above described construction is designed to be applied to the front wheel of a motor vehicle so as to utilize the existing front wheel construction without modification.

Having now described my invention, what I claim as new and desire to secure by Letters Patent, is:—

1. In an automotive brake, the combination with a brake drum associated with the front wheel of a motor vehicle and a steering knuckle for said wheel, of brake members mounted in said drum, a drum cover plate secured to said steering knuckle, and a brake chamber formed in said cover plate and operatively connected to said brake members.

2. In an automotive brake, the combination with a brake drum associated with the front wheel of a motor vehicle, brake members mounted in said drum and means for spreading said members, of a cover plate for said drum, a brake chamber associated with said cover plate and formed in part by a depression in said cover plate, and an operative connection between the brake chamber and said means.

3. In an automotive brake, the combination with a brake drum associated with the front wheel of a motor vehicle, brake members mounted in said drum and means for spreading said members, of a cover plate for said drum, a brake chamber formed in part in the cover plate and in part by a cap section and having its axis parallel with the axis of the drum, and an operative connection between the brake chamber and said means.

4. In an automotive brake, the combination with a brake drum associated with the front wheel of a motor vehicle and brake members mounted in said drum, of a cover plate for said drum, a brake chamber associated with said cover plate, a laterally movable wedge for spreading said brake members to frictionally engage the drum, a lever fulcrumed on said cover plate and operatively connected to said brake chamber, and a member connecting said wedge to said lever.

In testimony whereof I have hereunto set my hand.

SIDNEY G. DOWN.